(12) United States Patent
Lin et al.

(10) Patent No.: US 11,196,305 B2
(45) Date of Patent: Dec. 7, 2021

(54) WIRELESS CHARGING DEVICE AND WIRELESS CHARGING METHOD

(71) Applicant: Guangdong Oppo Mobile Telecommunications Corp., Ltd., Guangdong (CN)

(72) Inventors: Shangbo Lin, Guangdong (CN); Shiming Wan, Guangdong (CN); Jialiang Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 105 days.

(21) Appl. No.: 16/584,247

(22) Filed: Sep. 26, 2019

(65) Prior Publication Data
US 2020/0021148 A1    Jan. 16, 2020

Related U.S. Application Data

(63) Continuation of application No. PCT/CN2018/081971, filed on Apr. 4, 2018.

(30) Foreign Application Priority Data

Apr. 7, 2017    (WO) ................ PCT/CN2017/079784

(51) Int. Cl.
*H02J 7/00* (2006.01)
*H02J 50/80* (2016.01)
(Continued)

(52) U.S. Cl.
CPC .............. *H02J 50/80* (2016.02); *H02J 5/005* (2013.01); *H02J 7/00* (2013.01); *H02J 7/0026* (2013.01);
(Continued)

(58) Field of Classification Search
USPC .................................................. 320/106–115
See application file for complete search history.

(56) References Cited

U.S. PATENT DOCUMENTS

| 2009/0177906 A1 | 7/2009 | Paniagua, Jr. et al. |
| 2009/0237029 A1 | 9/2009 | Andelfinger |
| | | (Continued) |

FOREIGN PATENT DOCUMENTS

| CN | 102013717 A | 4/2011 |
| CN | 103370885 A | 10/2013 |
| | (Continued) | |

OTHER PUBLICATIONS

Extended EP Search Report for EP 18780781.3 dated Mar. 20, 2020.
(Continued)

*Primary Examiner* — Binh C Tat
(74) *Attorney, Agent, or Firm* — Young Basile Hanlon & MacFarlane, P.C.

(57) ABSTRACT

The present disclosure provides a wireless charging device and a wireless charging method. The wireless charging device includes a communication control module. The communication control module is configured to, when a power supply device is in a sleep state, control the power supply device to enter a wakeup state; and communicate with the power supply device in the wakeup state to determine a type of the power supply device, where the type of the power supply device includes a fast charging type and a non-fast charging type, a maximum output power of a fast charging power supply device is greater than or equal to a preset value, and a maximum output power of a non-fast charging power supply device is less than the preset value.

18 Claims, 3 Drawing Sheets

(51) Int. Cl.
   *H02J 50/10*   (2016.01)
   *H02M 3/07*   (2006.01)
   *H04B 5/00*   (2006.01)
   *H02J 5/00*   (2016.01)
   *H02J 50/12*   (2016.01)
   *H02J 7/02*   (2016.01)
   *H02J 7/04*   (2006.01)

(52) U.S. Cl.
   CPC ........ *H02J 7/0029* (2013.01); *H02J 7/00034* (2020.01); *H02J 7/0044* (2013.01); *H02J 7/00714* (2020.01); *H02J 7/025* (2013.01); *H02J 7/045* (2013.01); *H02J 50/10* (2016.02); *H02J 50/12* (2016.02); *H02M 3/07* (2013.01); *H04B 5/0037* (2013.01); *H04B 5/0075* (2013.01); *H02J 2207/20* (2020.01); *Y02B 40/00* (2013.01)

(56) References Cited

U.S. PATENT DOCUMENTS

| | | |
|---|---|---|
| 2014/0247052 A1 | 9/2014 | Hada |
| 2014/0247141 A1 | 9/2014 | Proud |
| 2016/0181856 A1 | 6/2016 | Lee et al. |
| 2016/0373166 A1* | 12/2016 | Yang ................ H04W 52/0241 |
| 2017/0355268 A1* | 12/2017 | Roberts ................ B60L 50/10 |
| 2018/0063789 A1* | 3/2018 | Chen ................ H04W 52/0229 |

FOREIGN PATENT DOCUMENTS

| | | |
|---|---|---|
| CN | 104283293 A | 1/2015 |
| CN | 105148402 A | 12/2015 |
| CN | 105337384 A | 2/2016 |
| EP | 3068017 A2 | 9/2016 |
| GN | 101232196 A | 7/2008 |
| GN | 106230049 A | 12/2016 |
| KR | 20140065585 A | 5/2014 |

OTHER PUBLICATIONS

Office Action for EP application 18780781.3 dated Oct. 16, 2020.
ISR with English translation for PCT application PCT/CN2018/081971 dated Jun. 22, 2018.
ISR with English translation for PCT application PCT/CN2017/079784 dated Dec. 4, 2017.
OA and English translation for IN application 201917042071 dated Jul. 6, 2020.
Communication pursuant to Article 94(3) EPC Examination for EP Application 187807813 dated Mar. 26, 2021.
Communication pursuant to Article 94(3) EPC for EP Application 18780781.3 dated Jul. 28, 2021. (5 pages).

* cited by examiner

200 when a power supply device is in a sleep state, a wireless charging device controls the power supply device to enter a wakeup state — S210 the wireless charging device communicates with the power supply device to determine a type of the power supply device, in which the type of the power supply device includes a fast charging power supply device and a non-fast charging power supply device, an output power of the fast charging power supply device is variable, and an output power of the non-fast charging power supply device is constant — S220

FIG. 5

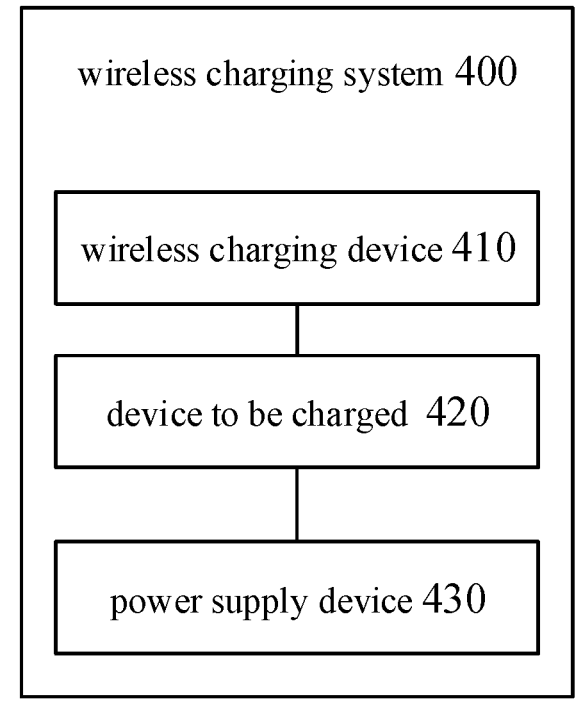

FIG. 6

WIRELESS CHARGING DEVICE AND WIRELESS CHARGING METHOD

CROSS-REFERENCE TO RELATED APPLICATION(S)

The present application is a continuation of International Application No. PCT/CN2018/081971, filed on Apr. 4, 2018, which claims priority to International Application No. PCT/CN2017/079784, filed on Apr. 7, 2017, the disclosures of both of which are incorporated herein by reference in their entireties.

TECHNICAL FIELD

The present disclosure relates to a field of wireless charging technology, and more particularly, to a wireless charging device and a wireless charging method.

BACKGROUND

At present, in the charging technology field, a device to be charged is typically charged in a wired charging mode.

In detail, taking a mobile phone as an example, when there is a need to charge the mobile phone, the mobile phone may be coupled with a power supply device via a charging cable (for example, a USB (universal serial bus) cable), and an output power of the power supply device may be transmitted to the mobile phone via the charging cable, to charge a battery in the mobile phone.

Charging cables are required for charging the device to be charged in the wired charging mode, which results in cumbersome operations in a charging preparation stage. Thus, a wireless charging mode has been favored more and more by people.

SUMMARY

In a first aspect, a wireless charging device is provided. The wireless charging device includes a communication control module. The communication control module is configured to control a power supply device to enter a wakeup state when the power supply device is in a sleep state, and to communicate with the power supply device in the wakeup state to determine a type of the power supply device. The type of the power supply device includes a fast charging type and a non-fast charging type, a maximum output power of the power supply device of the fast charging type is greater than or equal to a preset value, and a maximum output power of the power supply device of the non-fast charging type is less than the preset value.

In a second aspect, a wireless charging method is provided. The method includes: when a power supply device is in a sleep state, a wireless charging device controlling the power supply device to enter a wakeup state; and the wireless charging device communicating with the power supply device in the wakeup state, to determine a type of the power supply device, wherein the type of the power supply device includes a fast charging type and a non-fast charging type, a maximum output power of the power supply device of the fast charging type is greater than or equal to a preset value, and a maximum output power of the power supply device of the non-fast charging type is less than the preset value.

In a third aspect, a wireless charging system is provided. The wireless charging system includes the wireless charging device in the first aspect, and a device to be charged. The wireless charging device is configured to charge the device to be charged.

BRIEF DESCRIPTION OF DRAWINGS

FIG. 5 is a flowchart of a wireless charging method according to an embodiment of the present disclosure.

FIG. 6 is a block diagram of a wireless charging system according to an embodiment of the present disclosure.

DETAILED DESCRIPTION

The technical solutions in embodiments of the present disclosure will be described below with reference to drawings.

Generally, in the conventional wireless charging technology, a power supply device (such as an adapter) is coupled to a wireless charging device (such as a wireless charging base), and the wireless charging device charges the device to be charged wirelessly by transmitting the output power of the power supply device to the device to be charged in a wireless manner (e.g., by electromagnetic signals or electromagnetic wave).

According to different wireless charging principles, the wireless charging mode may be subdivided into magnetic coupling (or electromagnetic induction), magnetic resonance, and radio waves. Presently, the mainstream wireless charging standards include a QI standard, a PMA (power matters alliance) standard, and an A4WP (alliance for wireless power) standard. The QI standard and the PMA standard perform wireless charging by magnetic coupling. The A4WP standard perform wireless charging by magnetic resonance.

The conventional wireless charging method is described below with reference to FIG. 1.

Figure 1:
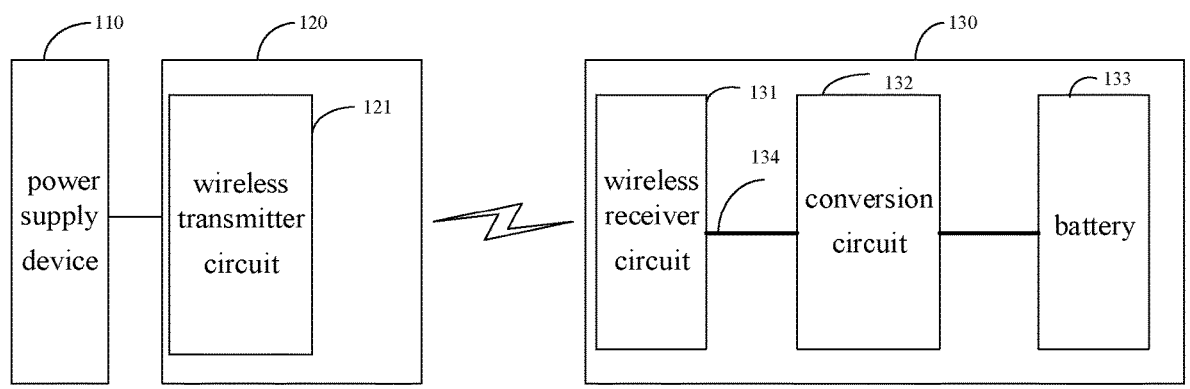
FIG. 1 is a block diagram of a conventional wireless charging system.

As illustrated in FIG. 1, the wireless charging system includes a power supply device 110, a wireless charging device 120, and a device to be charged 130. The wireless charging device 120 may be, for example, a wireless charging base. The device to be charged 130 may be, for example, a terminal.

After the power supply device 110 is coupled to the wireless charging device 120, the output current of the power supply device 110 is transmitted to the wireless charging device 120. The wireless charging device 120 may convert the output current of the power supply device 110 into electromagnetic signals (or electromagnetic wave) by the internal wireless transmitter circuit 121. For example, the wireless transmitter circuit 121 may convert the output current of the power supply device 110 into alternating current, and convert the alternating current into electromagnetic signals through a transmitting coil or a transmitting antenna (not shown).

The device to be charged 130 may receive the electromagnetic signals transmitted by the wireless transmitter circuit 121 through the wireless receiver circuit 131 and convert the electromagnetic signals into the output current of the wireless receiver circuit 131. For example, the wireless receiver circuit 131 may convert electromagnetic signals transmitted by the wireless transmitter circuit 121 into alternating current through a receiving coil or a receiving antenna (not shown), and perform rectification and/or filtering operations on the alternating current to convert the alternating current into an output voltage and an output current of the wireless receiver circuit 131.

In the conventional wireless charging technology, the wireless charging device 120 and the device to be charged 130 pre-negotiate the transmitting power of the wireless transmitter circuit 121 before wireless charging. Assuming that the power negotiated between the wireless charging device 120 and the device to be charged 130 is 5 W, the output voltage and output current of the wireless receiver circuit 131 are generally 5 V and 1 A. Assuming that the power negotiated between the wireless charging device 120 and the device to be charged 130 is 10.8 W, the output voltage and output current of the wireless receiver circuit 131 are generally 9 V and 1.2 A.

The output voltage of the wireless receiver circuit 131 is not suitable for being directly applied to both ends of the battery 133, but needs to be converted by a conversion circuit 132 in the device to be charged 130 to obtain the charging voltage and/or charging current expected by the battery 133 in the device to be charged 130.

The conversion circuit 132 may be configure to convert the output voltage of the wireless receiver circuit 131, to meet requirements of the charging voltage and/or charging current expected by the battery 133.

As an example, the conversion circuit 132 may refer to a charging management module, for example a charging integrated circuit (IC). The conversion circuit 132 is configured to manage the charging voltage and/or charging current of the battery 133 during charging of the battery 133. The conversion circuit 132 may have a voltage feedback function, and/or a current feedback function to enable management of the charging voltage and/or charging current of the battery 133.

For example, the charging process of the battery may include one or more of a trickle charging stage, a constant current charging stage, and a constant voltage charging stage. In the trickle charging stage, the conversion circuit 132 may utilize the current feedback function to ensure that a current flowing into the battery 133 in the trickle charging stage meets the charging current (such as a first charging current) expected by the battery 133. In the constant current charging stage, the conversion circuit 132 may utilize a current feedback loop to ensure that the current flowing into the battery 133 in the constant current charging stage meets the charging current (such as a second charging current, which may be greater than the first charging current) expected by the battery 133. In the constant voltage charging stage, the conversion circuit 132 may utilize a voltage feedback loop to ensure that a voltage applied to both ends of the battery 133 in the constant voltage charging stage meets the charging voltage expected by the battery 133.

As an example, when the output voltage of the wireless receiver circuit 131 is greater than the charging voltage expected by the battery 133, the conversion circuit 132 may be configured to perform a step-down process on the output voltage of the wireless receiver circuit 131, to enable the charging voltage obtained after the step-down conversion satisfies the requirements of the charging voltage expected by the battery 133. As still another example, when the output voltage of the wireless receiver circuit 131 is less than the charging voltage expected by the battery 133, the conversion circuit 132 may be configured to perform a boost process on the output voltage of the wireless receiver circuit 131, to enable the charging voltage obtained after the boost conversion satisfies the requirements of the charging voltage expected by the battery 133.

As another example, assume that the wireless receiver circuit 131 outputs a constant voltage of 5V. When the battery 133 includes a single battery cell (such as a lithium battery cell, a charging cut-off voltage of a single battery cell is typically 4.2V), the conversion circuit 132 (for example, a buck circuit) may perform a buck conversion on the output voltage of the wireless receiver circuit 131, such that the charging voltage obtained after the buck conversion meets a requirement of the charging voltage expected by the battery 133.

As another example, assume that the wireless receiver circuit 131 outputs a constant voltage of 5V. When the battery 133 includes two or more battery cells (such as lithium battery cell, a charging cut-off voltage of a single battery cell is typically 4.2V) coupled in series, the conversion circuit 132 (for example, a boost circuit) may perform a boost conversion on the output voltage of the wireless receiver circuit 131, such that the charging voltage obtained after the boost conversion meets a requirement of the charging voltage expected by the battery 133.

At present, the conventional wireless charging technology is limited to the standard wireless charging mode. In other words, the wireless charging device is only suitable for the standard power supply device, and only can provide standard wireless charging voltage and current (for example, 5 W charging mode in the QI standard) for the device to be charged, making the charging device too long. However, when the power supply device has the fast charging function, for example, when the power supply device is a fast charging adapter, since the device to be charged cannot identify the fast charging function, the power supply device still only can provide the standard wireless charging mode for the device to be charged, which cannot fully utilize the fast charging function for wireless charging, resulting in poor user experience.

In order to solve the above problems, embodiments of the present disclosure provide a wireless charging device. When the wireless charging device is not coupled to the device to be charged, the wireless charging device may also identify the type of the power supply device, for example, whether the power supply device is a fast charging power supply device. In this way, when the wireless charging device identifies the power supply device having the fast charging function, the wireless charging device may adopt the fast charging mode to charge the device to be charged.

Figure 2:
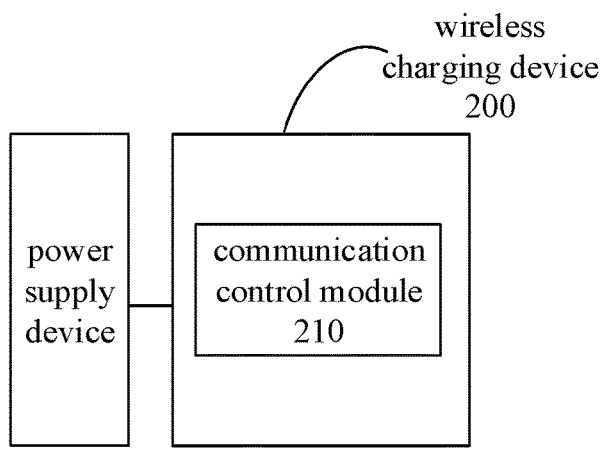
FIG. 2 is a block diagram of a wireless charging device according to an embodiment of the present disclosure.

FIG. 2 is a block diagram of a wireless charging device 200 according to an embodiment of the present disclosure. As illustrated in FIG. 2, the wireless charging device 200 includes a communication control module 210. In detail, the wireless charging device 200 may be coupled to the power supply device, for example, may be coupled to the power supply device via a charging interface. The communication control module 210 is configured to control the power supply device to enter a wakeup state when the power supply device is in a sleep state, and to communicate with the power supply device in the wakeup state to determine the type of the power supply device. The type of the power supply device includes a fast charging type and a non-fast charging type, a maximum output power of the power supply device of the fast charging type is greater than or equal to a preset value, and a maximum output power of the power supply device of the non-fast charging type is less than the preset value.

In embodiments of the present disclosure, the wireless charging device 200 may be coupled to the power supply device via the charging interface. When the wireless charging device 200 is supplied with power, that is, when there is current flowing in the wireless charging device 200, it may be determined that the charging interface is coupled with the power supply device.

It should be understood that, in order to reduce power consumption, when the power supply device is not coupled with a load, an output current of the power supply device is relatively small, i.e., less than a present value, i.e., the power supply device is in the sleep state. In detail, when the wireless charging device 200 is coupled with the power supply device, and when the wireless charging device 200 does not charge the device to be charged, the output current of the power supply device is relatively small, and the power supply device is in the sleep state, in which the output current of the power supply device is less than the preset value. In some embodiments, the preset value may be set according to practical use. For example, when the power supply device does not have the load, the output current is typically less than 100 mA. Since the current is not stable, and considering fluctuation and error factors, generally, the preset value may be set to be greater than 100 mA, for example, may be set to be 300 mA.

When the power supply device is in the sleep state, in order to obtain the type of the power supply device, the wireless charging device 200 may control the power supply device to quit the sleep state and enter the wakeup state through the communication control module 210, such that the communication control module 210 determines the type of the power supply device, i.e., determines whether the power supply device is a fast charging power supply device or a non-fast charging power supply device.

In detail, the communication control module 210 may enable the output current of the power supply device to be greater than or equal to the preset value by increasing the load current, so as to enable the power supply device in the sleep state to enter the wakeup state. For example, the wireless charging device 200 may include a load circuit, and the communication control module 210 s coupled to the load circuit. When the communication control module 210 controls the load circuit to switch off, i.e., controls the power supply device to be not coupled with the load circuit, the power supply device is in the sleep state. When the communication control module 210 controls the load circuit to switch on, i.e., controls the power supply device to be coupled with the load circuit, to enable the output current of the power supply device to be greater than or equal to the preset value, the power supply device enters the wakeup state from the sleep state.

In some embodiments, the load circuit may include a resistor, and may further include a switch. The communication control module 210 switches on or off connection between the load circuit and the power supply device by controlling the switch. A resistance value of the resistor may be set according to practical use, for example, may be 12n.

It should be understood that, the communication control module 210 may determine the type of the power supply device after waking up the power supply device in the sleep state. In detail, in embodiments of the present disclosure, a communication mode between the wireless charging device and the power supply device is not limited. As an example, the wireless charging device may be coupled to the power supply device via a communication interface other than the charging interface, and may perform communication with the power supply device via the communication interface. As another example, the wireless charging device may perform near field communication (NFC) with the power supply device in a wireless manner. As still another example, the wireless charging device may perform communication with the power supply device via the charging interface without setting an additional communication interface.

Assume that the wireless charging device 200 is coupled to and communicate with the power supply device via the charging interface 210, the charging interface 210 may be a USB interface or a lightning interface. Assume that the charging interface 210 is the USB interface, the wireless charging device 200 communicate with the power supply device via data wires of the USB cable.

For example, the communication control module 210 of the wireless charging device 200 queries whether the type of the power supply device is the fast charging power supply device through data wires (D+ and/D− wires) of the USB cable. When receiving a correct response of the power supply device, the communication control module 210 determines that the power supply device is the fast charging power supply device. When receiving an error response or receiving no response, the communication control module 210 determines that the power supply device is the non-fast charging power supply device. In detail, the wireless charging device 200 may send a query message to the power supply device. When the wireless charging device receives a correct reply message sent by the power supply device, the reply message indicates that the power supply device is of the fast charging type. For example, the correct rely message may be set as "01", and when the reply message of "01" is received, it indicates that the type of the power supply device is the fast charging type. Otherwise, when the wireless charging device does not receive the reply message sent by the power supply device or receives a wrong reply message, the reply message indicates that the power supply device is of the non-fast charging type. For example, the correct rely message may be set as "01", and when the reply message received is not "01", it indicates that the type of the power supply device is the non-fast charging type.

For another example, the charging interface may be a USB interface (such as a USB TYPE-C interface) that supports a power delivery (PD) communication protocol, and the wireless charging device may perform communication with the power supply device based on the PD communication protocol. Embodiments of the present disclosure is not limited thereto.

It should be understood that the type of the power supply device is not specifically limited in the embodiments of the present disclosure. For example, the power supply device may be an adapter, a power bank, a car charger, or a computer. Specifically, the types of the power supply devices may include two classifications, one may be the fast charging type corresponding to the first wireless charging mode, in which the maximum output power of the power supply device of the fast charging type is greater than or equal to a preset value, and the other may be the non-fast charging type corresponding to the second wireless charging mode in which the maximum output power of the power supply device of the non-fast charging type is less than the preset value. For example, the type of the power supply device corresponding to the first wireless charging mode may be a fast charging adapter, which supports the fast charging function, and the type of the power supply device corresponding to the second wireless charging mode may be a standard adapter or a USB interface of the computer, which does not support the fast charging function.

It should be understood that the output current of the power supply device may be constant direct current, pulsating direct current or alternating current, which is not specifically limited in the embodiments of the present disclosure.

In embodiments of the present disclosure, after the wireless charging device 200 obtains the type of the power supply device through the communication control module 210, since the wireless charging device 200 is not coupled to the device to be charged, the wireless charging device 200 may control the output current of the power supply device to be less than the preset value, such that the power supply device quits the wakeup state and re-enters the sleep state, thereby reducing power consumption. In detail, the wireless charging device 200 may switch off the load circuit, such that the output current of the power supply device reduces to less than the preset value and the power supply device enters the sleep state.

Figure 3:
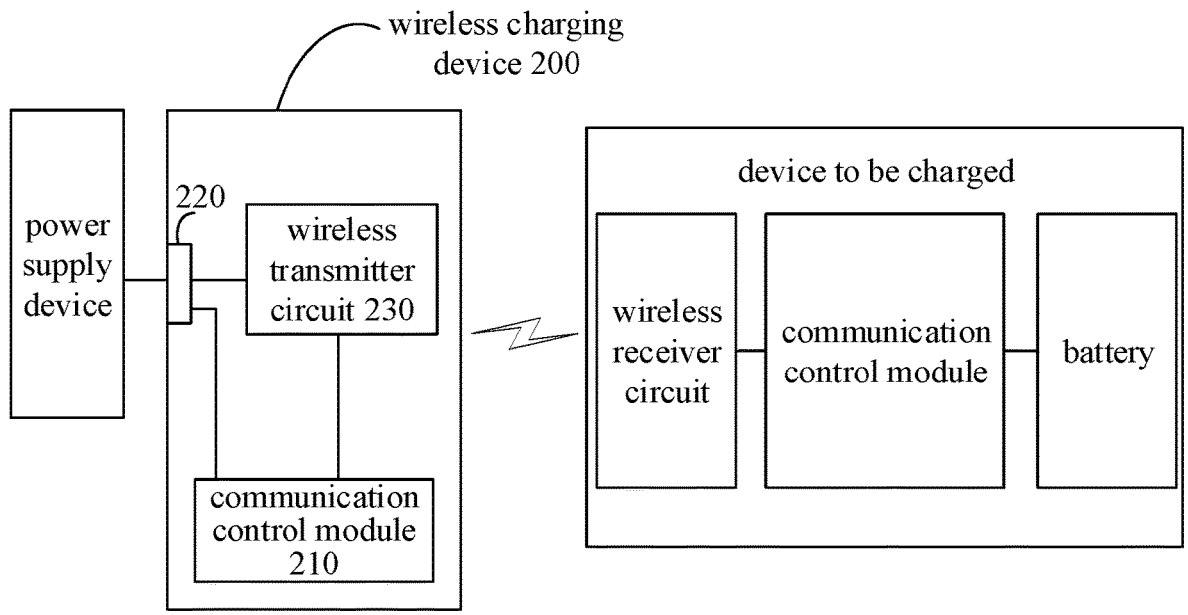
FIG. 3 is another block diagram of a wireless charging device according to an embodiment of the present disclosure.

Further, FIG. 3 illustrates another block diagram of a wireless charging device according to an embodiment of the present disclosure. As illustrated in FIG. 3, in embodiments of the present disclosure, the wireless charging device 200 may further include a charging interface 220, and may further include a wireless transmitter circuit 230. In detail, after the wireless charging device 200 obtains the type of the power supply device, and when the wireless charging device is coupled to the device to be charged, the wireless transmitter circuit 230 may be configured to, when the power supply device is the fast charging power supply device, transmit an electromagnetic signal in a first wireless charging mode to charge a battery of the device to be charged, or, when the power supply device is the non-fast charging power supply device, transmit an electromagnetic signal in a second wireless charging mode to charge the battery. A charging speed of the wireless transmitter circuit charging the battery in the first wireless charging mode is greater than a charging speed of the wireless transmitter circuit charging the battery in the second wireless charging mode.

In addition, after the wireless charging device 200 identifies the type of the power supply device, the wireless charging device 200 may further provide the type of the power supply device to the device to be charged, such that the device to be charged may enter the corresponding wireless charging mode according to the type of the power supply device. For example, when the power supply device is the fast charging power supply device, the device to be charged enters the first wireless charging mode, and when the power supply device is the normal power supply device, the device to be charges enters the second wireless charging mode.

It should be noted that in embodiments of the present disclosure, both the wireless charging device 200 and the device to be charged may support the first wireless charging mode and the second wireless charging mode, in which the charging speed of the wireless charging device 200 charging the device to be charged in the first wireless charging mode is greater than the charging speed of the wireless charging device charging the device to be charged in the second wireless charging mode. Compared to the wireless charging device working in the second wireless charging mode, it takes less time for the wireless charging device working in the first wireless charging mode to charge the battery with the same capacity in the device to be charged.

It should be understood that, when the power supply device is the non-fast charging power supply device, i.e., when the maximum output power of the non-fast charging power supply device is less than the preset value, the corresponding second wireless charging mode may be referred to as the normal wireless charging mode. Correspondingly, when the power supply device is the fast charging power supply device, i.e., when the maximum output power of the fast charging power supply device is greater than or equal to the preset value, the corresponding first wireless charging mode may be referred to as the fast wireless charging mode.

It should be understood that the preset value may be set according to practical use, which is not limited in embodiments of the present disclosure.

Figure 4:
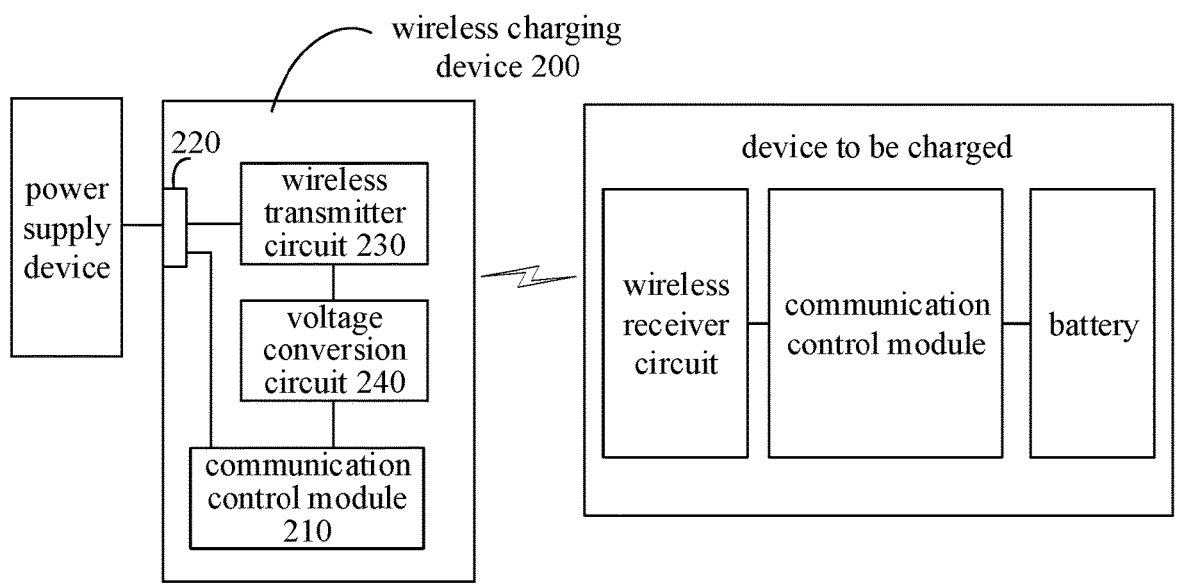
FIG. 4 is yet another block diagram of a wireless charging device according to an embodiment of the present disclosure.

In an embodiment of the present disclosure, as illustrated in FIG. 4, the wireless charging device 200 further includes a voltage conversion circuit 240. The voltage conversion circuit 240 is configured to perform voltage conversion on the current provided to the wireless transmitter circuit 230 when the voltage value of the current provided to the wireless transmitter circuit 230 does not meet a preset condition. As mentioned above, in one embodiment, the current provided to the wireless transmitter circuit 230 may be provided by the power supply device.

Of course, in some embodiments, when the voltage provided to the wireless transmitter circuit 230 may reach the voltage requirement of the wireless transmitter circuit 230 for the input voltage, the voltage conversion circuit 240 may be omitted, to simplify the implementation of the wireless charging device. The voltage requirement of the wireless transmitter circuit 230 for the input voltage may be set according to practical use, for example, may be set to 10V.

In an embodiment of the present disclosure, the voltage value of the current provided to the wireless transmitter circuit 230 not meeting the preset condition may mean that, the voltage value is less than the required voltage the wireless transmitter circuit 230, or the voltage value is greater than the required voltage of the wireless transmitter circuit 230. For example, when the wireless charging device 200 identifies the type of the power supply device as the non-fast charging type, if the wireless charging device 200 still performs the wireless charging in the first charging mode, in which charging mode, the requirement for the input voltage of the wireless transmitter circuit 230 is higher (for example, the required voltage is 10V or 20V), i.e., if the voltage provided to the wireless transmitter circuit 230 cannot reach the voltage requirement of the wireless transmitter circuit 230, i.e., cannot reach the voltage requirement of the device to be charged, the voltage conversion circuit 240 may perform boost process on the input voltage, to enable the boosted voltage to reach the voltage requirement of the wireless transmitter circuit 230.

In contrast, when the wireless charging device 200 identifies the type of the power supply device as the fast charging type, if the wireless charging device 200 still performs wireless charging in the second charging mode, i.e., if the output voltage of the power supply device exceeds the voltage requirement of the wireless transmitter circuit, the voltage conversion circuit 240 may perform step-down process on the input voltage, to enable the stepped-down voltage to reach the voltage requirement of the wireless transmitter circuit 230.

Therefore, with the voltage conversion circuit 240, when the power supply device is the non-fast charging power supply device, charging the device to be charged in the first charging mode may still be achieve; or, with the voltage conversion circuit 240, when the power supply device is the fast charging power supply device, charging the device to be charged in the second charging mode may still be achieved, which can improve the charging speed, and achieve the compatibility of the wireless charging device 200.

The normal wireless charging mode may refer to a wireless charging mode in which the transmitting power (or output power) of the wireless charging device is relatively small and the output power is fixed (usually less than 15 W, and the commonly used transmitting power is 5 W or 10 W), and correspondingly, the maximum output power of the power supply device of the non-fast charging type may be set as the fixed power, or the transmitting power of the power supply device of the non-fast charging type may be set as the fixed power, for example, set to less than 15 W, and generally, set as 5 W or 10 W. In the normal wireless charging mode, it may take several hours to fully charge a larger capacity battery (such as a battery with 3000 mAh). In contrast, the fast wireless charging mode may refer to a wireless charging mode in which the transmitting power (or output power) of the wireless charging device is relatively higher and the output power is adjustable (usually greater than 15 W), and correspondingly, the maximum output power of the power supply device of the fast charging type may be set as the higher power value, for example, set to greater than 15 W, for example, set as 20 W. in detail, the transmitting power of the power supply device of the fast charging type may be set as adjustable power, or the transmitting power of the power supply device of the fast charging type may be set as fixed power. Compared to the normal wireless charging mode, the charging speed of the wireless charging device in the fast wireless charging mode is faster, and the charging time required for fully charging a battery with a same capacity in the fast wireless charging mode may be significantly shortened.

It should be understood that, in some embodiments, the fixed output power does not necessarily mean that the output power remains completely unchanged, instead, the fixed output power may vary within a certain range, for example, the output power fluctuates by 0.5 W either way of 10 W Different from the conventional wireless charging device, the wireless charging device 200 in embodiments of the present disclosure may perform wireless communication with the device to be charged. Specifically, after the power supply device is coupled to the wireless charging device 200 of embodiments of the present disclosure, the wireless charging device 200 may identify the type of the power supply device, and the wireless charging device 200 may charge the device to be charged in a corresponding wireless charging mode according to the identified type of the power supply device. For example, when the identified power supply device is the fast charging power supply device, the wireless charging device 200 may charge the device to be charged in the first wireless charging mode; and when the identified power supply device is the normal power supply device, the wireless charging device 200 may charge the device to be charged in the second wireless charging mode.

In some embodiments, in the first wireless charging mode, the power of the electromagnetic signal transmitted by the wireless charging device 200 through the wireless transmitter circuit 230 matches the charging voltage and/or the charging current present required by the battery in the device to be charged. The manner of adjusting the transmitting power of the wireless transmitter circuit 230 is not specifically limited in embodiments of the present disclosure.

In an embodiment, the wireless charging device 200 may communicate with the power supply device, to adjust the output voltage and/or output current of the power supply device, thereby adjusting the transmitting power of the wireless transmitter circuit 230. Adjusting the transmitting power of the wireless transmitter circuit 230 is controlled by the power supply device, which adjusts the transmitting power of the wireless transmitter circuit 230 by changing the output voltage and/or the output current. This way of adjusting the transmitting power is advantageous in that, the power supply device may provide as much power as the wireless charging device needs, thus avoiding waste of power.

In detail, the wireless charging device 200 may actively determine whether there is a need to adjust the output voltage and/or output current of the power supply device. Or, the wireless charging device 200 may act as a bridge of communication between the power supply device and the device to be charged, which is mainly responsible for forwarding messages between the two.

For example, during the wireless charging, the communication control module 210 communicates with the device to be charged, to determine whether there is a need to adjust the output voltage and/or output current of the power supply device. When there is a need to adjust the output voltage and/or output current of the power supply device, the communication control module 210 communicates with the power supply device, to instruct the power supply device to adjust the output voltage and/or output current of the power supply device.

For another example, during the wireless charging, the communication control module 210 in the wireless charging device 200 performs wireless communication with the device to be charged, to obtain adjustment information, in which the adjustment information is configured to instruct adjusting the output voltage and/or output current of the power supply device. The communication control module 210 communicates with the power supply device, to send the adjustment information to the power supply device, such that the power supply device adjusts the output voltage and/or output current of the power supply device according to the adjustment information. For example, the adjustment information may instruct the power supply device to increase the transmitting power of the wireless transmitter circuit. For another example, the adjustment information may instruct the power supply device to decrease the transmitting power of the wireless transmitter circuit. More specifically, the power supply device may set a plurality of levels for the transmitting power of the wireless transmitter circuit. Every time when the power supply device receives the adjustment information, it adjusts the transmitting power by one level until the output voltage and/or the output current of the wireless receiver circuit in the device to be charged match the charging stage where the battery presently is.

In another embodiment, the wireless charging device 200 may adjust a power quantity drawn by the wireless transmitter circuit 230 from the maximum output power provided by the power supply device, thereby adjusting the transmitting power of the wireless transmitter circuit 230. In other words, in embodiments of the present disclosure, adjusting the transmitting power of the wireless transmitter circuit 230 is controlled by the wireless charging device 200, and the wireless charging device 200 adjusts the transmitting power of the wireless transmitter circuit 230 immediately once receiving the adjustment information of the device to be charged, which has the advantages of fast adjustment speed and high efficiency.

In detail, after the wireless charging device 200 enters the first wireless charging mode for charging the device to be charged, the wireless charging device 200 may further perform wireless communication with the device to be charged to adjust the transmitting power of the wireless transmitter circuit 230 according to the requirement of the battery to be charged. In other words, the output power of the power supply device is fixed, and the transmitting power of the wireless charging device 200 may be adjusted based on adjustment information fed back by the device to be charged.

As an example, the device to be charged may send adjustment information to the wireless charging device 200, to instruct the wireless charging device 200 to adjust the transmitting power of the wireless transmitter circuit. For example, the adjustment information may instruct the wireless charging device 200 to increase the transmitting power of the wireless transmitter circuit. For another example, the adjustment information may instruct the wireless charging device 200 to decrease the transmitting power of the wireless transmitter circuit. More specifically, the wireless charging device 200 may set a plurality of levels for the transmitting power of the wireless transmitter circuit 230. Every time when the wireless charging device 200 receives the adjustment information, it adjusts the transmitting power of the wireless transmitter circuit 230 by one level until the output voltage and/or the output current of the wireless receiver circuit in the device to be charged match the charging stage where the battery presently is.

In the second wireless charging mode, the power supply device may be the normal power supply device with the fixed output power, the wireless charging device 200 does not adjust the power outputted by the power supply device, and the device to be charged is charged with the fixed transmitting power.

In embodiment of the present disclosure, in addition to the above communication content, other communication information may be communicated between the wireless charging device 200 and the device to be charged. In some embodiments, information used for safety protection, abnormality detection or failure processing, for example, temperature information of the battery 232, information indicating entering overvoltage protection or overcurrent protection, and power transmission efficiency information (the power transmission efficiency information may be configured to indicate a power transmission efficiency between the wireless transmitter circuit and the wireless receiver circuit), may be communicated between the wireless charging device and the device to be charged.

For example, when the temperature of the battery is too high, the wireless charging device and/or the device to be charged may control the charging loop to enter a protection state, for example, control the charging loop to stop wireless charging. For another example, after the wireless charging device receives the indication information indicating overvoltage protection or overcurrent protection sent by the device to be charged, the wireless charging device may reduce the transmitting power or stop working. For another example, after the wireless charging device receives the power transmission efficiency information sent by the device to be charged, if the power transmission efficiency is less than a preset threshold, the wireless charging device is controlled to stop working, and the user is informed of the event by, for example, displaying information indicating that the power transmission efficiency is too low through the display, or indicating that the power transmission efficiency is too low through the indicator light, such that the user may adjust the wireless charging environment.

In embodiments of the present disclosure, the wireless communication mode between the wireless charging device 200 and the device to be charged is not limited. For example, the wireless charging device and the device to be charged may perform the wireless communication based on Bluetooth, Wi-Fi (wireless fidelity) or backscatter modulation (or power load modulation).

The charging process of the battery may include at least one of a trickle charging stage, a constant current charging stage, and a constant voltage charging stage.

For example, in the trickle charging stage of the battery, the power of the electromagnetic signals transmitted by the wireless charging device matches the charging current corresponding to the trickle charging stage. In other words, during the trickle charging stage of the battery, the wireless charging device adjusts the transmitting power of the wireless transmitter circuit, such that the output current of the wireless receiver circuit matches the charging current corresponding to the trickle charging stage (or, such that the output current of the wireless receiver circuit satisfies a requirement of the charging current of the battery during the trickle charging stage).

Take the charging current corresponding to the trickle charging stage being 1 A as an example. When the battery is in the trickle charging stage, the device to be charged may detect the output current of the wireless receiver circuit in real time. When the output current of the wireless receiver circuit is greater than 1 A, the device to be charged may communicate with the wireless charging device, such that the wireless charging device adjusts the transmitting power of the wireless transmitter circuit, to enable the output current of the wireless receiver circuit to return back to 1 A.

For example, in the constant voltage charging stage of the battery, the power of the electromagnetic signal transmitted by the wireless charging device matches the charging voltage corresponding to the constant voltage charging stage. In other words, in the constant voltage charging stage of the battery, the wireless charging device adjusts the transmitting power of the wireless transmitter circuit, such that the output voltage of the wireless receiver circuit matches the charging voltage corresponding to the constant voltage charging stage (or, such that the output voltage of the wireless receiver circuit satisfies the requirement of the charging voltage of the battery during the constant voltage charging stage).

Take the charging voltage corresponding to the constant voltage charging stage being 5V as an example. When the battery is in the constant voltage charging stage, the device to be charged may detect the output voltage of the wireless receiver circuit in real time. When the output voltage of the wireless receiver circuit is less than 5V, the device to be charged may perform wireless communication with the wireless charging device, so that the wireless charging device adjusts the transmitting power of the wireless transmitter circuit, to make the output voltage of the wireless receiver circuit return to 5V.

For example, in the constant current charging stage of the battery, the power of the electromagnetic signal transmitted by the wireless charging device matches the charging current corresponding to the constant current charging stage. In other words, in the constant current charging stage of the battery, the wireless charging device adjusts the transmitting power of the wireless transmitter circuit, such that the output current of the wireless receiver circuit matches the charging current corresponding to the constant current charging stage (or, such that the output current of the wireless receiver circuit satisfies the requirement of the charging current of the battery during the constant current charging stage).

Take the charging current corresponding to the constant current charging stage being 2 A as an example. When the battery is in the constant current charging stage, the device to be charged may detect the output current of the wireless receiver circuit in real time. When the output current of the wireless receiver circuit is less than 2 A, the device to be charged may perform wireless communication with the wireless charging device, so that the wireless charging device adjusts the transmitting power of the wireless transmitter circuit, to make the output current of the wireless receiver circuit return to 2 A.

There may be various reasons resulting in change of the output current of the wireless receiver circuit, which will not be limited in embodiments of the present disclosure. For example, when transmission of the electromagnetic signal between the wireless transmitter circuit and the wireless receiver circuit is interfered, the energy conversion efficiency is reduced, thus resulting in that the output current of the wireless receiver circuit is less than 2 A.

It should be noted that, it is not necessary to keep the charging current completely constant during the constant current charging stage or the constant current stage involved in embodiments of the present disclosure. For example, it may refer to in general that, a peak value or a mean value of the charging current keeps constant in a certain time period. In practice, a multi-stage constant current mode is typically adopted for charging in the constant current charging stage.

The multi-stage constant current charging may include N constant current stages, where N is an integer no less than 2. The first charging stage of the multi-stage constant current charging starts with a predetermined charging current. N constant current stages in the multi-stage constant current charging are performed in sequence from the first charging stage to the $N^{th}$ charging stage. After the constant current charging is switched from one constant current stage to the next constant current stage, the peak value or mean value of the current with the pulsating waveform may be decreased. When the battery voltage reaches a charging stop voltage threshold, the constant current charging is switched from the present constant current stage to the next constant current stage. The current change between two adjacent constant current stages may be gradual, or may be in a stepped skip manner.

It should be understood that, the device to be charged used in embodiments of the present disclosure may refer to the "terminal". The "terminal" may include, but is not limited to a device configured to receive/transmit communication signals via a wired connection (for example, public switched telephone network (PSTN), digital subscriber line (DSL) connection, digital cable connection, direct cable connection and/or another data connection/network) and/or via a wireless interface (for example, cellular network, wireless local area network (WLAN), digital TV network such as digital video broadcasting handheld (DVB-H) network, satellite network, an amplitude modulation-frequency modulation (AM-FM) broadcasting transmitter, and/or a wireless interface of another communication terminal). The communication terminal configured to communicate via the wireless interface may be referred to as "wireless communication terminal", "wireless terminal" and/or "mobile terminal". Examples of a mobile terminal include, but are not limited to a satellite phone or a cell phone, a terminal combining a cell radio phone and a personal communication system (PCS) having capability of data process, fax, and data communication, a personal digital assistant (PDA) including a radio phone, a pager, Internet/Intranet access, a web browser, a note pad & address book, a calendar and/or a global positioning system (GPS) receiver, and a common laptop and/or handheld receiver, or other electronic devices including a radio phone transceiver. In addition, the device to be charged or terminal used in embodiments of the present disclosure may further include a power bank. The power bank may receive charging from the adapter, and store the energy, for providing power for other electronic devices.

Therefore, the wireless charging device of embodiments of the present disclosure may wake up the coupled power supply device (the power supply device enters the wakeup state from the sleep state) before charging the device to be charged, so as to communicate with the power supply device to determine whether the type of the coupled power supply device is of the fast charging type. When the coupled power supply device is of the fast charging type, the wireless charging device may perform fast charging on the device to be charged, enhancing the charging speed and improving user experience.

Hereinbefore, the wireless charging device according to embodiments of the present disclosure has been described in detail with reference to FIGS. 1-4. Hereinafter, a wireless charging method according to embodiments of the present disclosure will be described with reference to FIG. 5 and FIG. 6.

FIG. 5 illustrates a schematic flowchart of a wireless charging method 300 according to an embodiment of the present disclosure. The method 300 may be executed by the wireless charging device as illustrated in FIGS. 2-4. As illustrated in FIG. 5, the method 300 includes followings. At block 5310, when a power supply device is in a sleep state, a wireless charging device controls the power supply device to enter a wakeup state. At block 5320, the wireless charging device communicates with the power supply device in the wakeup state, to determine a type of the power supply device. The type of the power supply device includes a fast charging type and a non-fast charging type, a maximum output power of the power supply device of the fast charging type is greater than or equal to a preset value, and a maximum output power of the power supply device of the non-fast charging type is less than the preset value.

In an embodiment, when the power supply device is in the sleep state, the wireless charging device controlling the power supply device to enter the wakeup state, includes: when the power supply device is in the sleep state, the wireless charging device controlling an output current of the power supply device to be greater than or equal to a preset value, to enable the power supply device to enter the wakeup state.

In an embodiment, when the power supply device is in the sleep state, the wireless charging device controlling the output current of the power supply device to be greater than or equal to the preset value, includes: when the power supply device is in the sleep state, the wireless charging device controlling the output current of the power supply device to be greater than or equal to the preset value by switching on a load circuit.

In an embodiment, communication between the communication control module and the power supply device is bidirectional communication.

In an embodiment, a charging interface is a universal serial bus USB interface or a lightning interface.

In an embodiment, the charging interface is the USB interface, and the communication control module communicates with the power supply device based on data wires of the USB interface.

In an embodiment, the method further includes: when the power supply device is of the fast charging type, the wireless charging device charging a battery of a device to be charged in a first wireless charging mode; when the power supply device is of the non-fast charging type, the wireless charging device charging the battery of the device to be charged in a second wireless charging mode, wherein a charging speed of the wireless charging device charging the battery in the first wireless charging mode is greater than a charging speed of the wireless charging device charging the battery in the second wireless charging mode.

In an embodiment, the method further includes: when the power supply device is of the non-fast charging type, performing boost process on an output voltage of the wireless charging device, to enable the wireless charging device to transmit an electromagnetic signal in a first wireless charging mode to charge a battery of a device to be charged; or when the power supply device is of the fast charging type, perform step-down process on an output voltage of the wireless charging device, to enable the wireless charging device to transmit an electromagnetic signal in a second wireless charging mode to charge the battery, wherein a charging speed of the wireless charging device charging the battery in the first wireless charging mode is greater than a charging speed of the wireless charging device charging the battery in the second wireless charging mode.

In an embodiment, the first wireless charging mode is a wireless charging mode in which an output power of the wireless transmitter circuit is variable, and the second wireless charging mode is a wireless charging mode in which the output power of the wireless transmitter circuit is fixed.

In an embodiment, in another implementation of the second aspect, in the first wireless charging mode, a power of the electromagnetic signal transmitted by the wireless charging device matches a charging voltage and/or a charging current present required by the battery.

In an embodiment, the wireless charging device charging the battery of the device to be charged in the first wireless charging mode includes: the wireless charging device performing wireless communication with the device to be charged to determine the charging voltage and/or the charging current presently required by the battery; and the wireless charging device adjusting a transmitting power, such that the power of the electromagnetic signal transmitted by the wireless transmitter circuit matches the charging voltage and/or the charging current presently required by the battery.

A charging process of the battery includes at least one of a trickle charging state, a constant current charging stage and a constant voltage charging stage.

In an embodiment, in the constant current charging stage of the battery, a power of the electromagnetic signal transmitted by the wireless charging device matches the charging current corresponding to the constant current charging stage.

In an embodiment, in the constant voltage charging stage of the battery, the power of the electromagnetic signal transmitted by the wireless charging device matches the charging voltage corresponding to the constant voltage charging stage.

In an embodiment, the power supply device is integrated in the wireless charging device.

In an embodiment, the power supply device is an adapter, a power bank or a computer.

Therefore, in the wireless charging method of embodiments of the present disclosure, the wireless charging device may wake up the coupled power supply device (the power supply device enters the wakeup state from the sleep state) before charging the device to be charged, so as to communicate with the power supply device to determine whether the type of the coupled power supply device is of the fast charging type. When the coupled power supply device is of the fast charging type, the wireless charging device may perform fast charging on the device to be charged, enhancing the charging speed and improving user experience.

It should be understood that in various embodiments of the present disclosure, sequence number of above processes does not imply execution order of the processes, and the execution order of the processes should be determined according to their functions and internal logic. The sequence number should not construct any limitation to the implementation of embodiments of the present disclosure.

In addition, the term "and/or" herein merely is just an association relation that describes association objects, which means that there may be three kinds of relationships, for example, A and/or B may mean that, A exists separately, A and B exists simultaneously, and B exists separately. In addition, the character "/" herein generally means that the object before the character "/" and the object after the character "/" are associated with an "or" relationship.

Embodiments of the present disclosure also provide a wireless charging system. As illustrated in FIG. 6, the wireless charging system 400 may include a wireless charging device 410, a device to be charged 420, and a power supply device 430. The wireless charging device 410 may correspond to the wireless charging device 200 in embodiments of the present disclosure. The device to be charged 420 and the power supply device 430 may correspond to the device to be charged and the power supply device in the wireless charging method 300 of embodiments of the present disclosure. The device to be charged 420 and the power supply device 430 may also correspond to the device to be charged and the power supply device as illustrated in FIGS. 2-4 in embodiment of the present disclosure.

Those skilled in the art may appreciate that the elements and algorithm steps of the various examples described in connection with the embodiments disclosed herein may be implemented in electronic hardware or a combination of computer software and electronic hardware. Whether these functions are executed in hardware or software depends on the specific application and design constraints of the solution. A person skilled in the art may use different methods to implement the described functions for each particular application, but such implementation should not be considered to be beyond the scope of the present application.

A person skilled in the art may clearly understand that for the convenience and brevity of the description, the specific working process of the system, the device and the unit described above refer to the corresponding process in the foregoing method embodiment, and details are not described herein again.

In several embodiments provided by the present disclosure, it should be understood that, the system, devices and method disclosed in several embodiments provided by the present disclosure may be realized in any other manner. For example, the device embodiments described above may be merely examples, for example, the units are just divided according to logic functions. In practical implementation, the units may be divided in other manners, for example, multiple units or components may be combined or integrated into another system, or some features may be omitted or not executed. In addition, the mutual coupling or direct coupling or communication connection described or discussed may be implemented via some interfaces, and indirect coupling or communication connection between devices or units may be electrical, mechanical or of other forms.

The units illustrated as separate components may be or not be separated physically, and components described as units may be or not be physical units, i.e., may be located at one place, or may be distributed onto multiple network units.

It is possible to select some or all of the units according to actual needs, for realizing the objective of embodiments of the present disclosure In addition, respective functional units in respective embodiments of the present disclosure may be integrated into one processing unit, or may be present as separate physical entities. It is also possible that two or more than two units are integrated into one unit.

If the functions are realized in form of functional software units and are sold or used as separate products, they may be stored in a computer readable storage medium. Based on this understanding, the parts of the technical solutions or the essential parts of the technical solutions (i.e. the parts making a contribution to the related art) may be embodied in form of software product, which is stored in a storage medium, and includes several instruction used for causing a computer device (for example, a personal computer, a server or a network device) to execute all or part of steps in the methods described in respective embodiments of the present disclosure. The above storage medium may be any medium capable of storing program codes, including a USB flash disk, a mobile hard disk, a Read-Only Memory (ROM), a Random Access Memory (RAM), a disc, or a light disk.

Although explanatory embodiments have been shown and described, it would be appreciated by those skilled in the art that the above embodiments cannot be construed to limit the present disclosure, and changes, alternatives, and modifications may be made in the embodiments without departing from scope of the present disclosure.

What is claimed is:

1. A wireless charging device, comprising:
    a communication control module, configured to control a power supply device to enter a wakeup state when the power supply device is in a sleep state, and to communicate with the power supply device in the wakeup state to determine a type of the power supply device, wherein the type of the power supply device comprises a fast charging type and a non-fast charging type, a maximum output power of the power supply device of the fast charging type is greater than or equal to a preset value, and a maximum output power of the power supply device of the non-fast charging type is less than the preset value; and
    a wireless transmitter circuit, configured to, when the power supply device is of the fast charging type, transmit an electromagnetic signal in a first wireless charging mode to charge a battery of a device to be charged, or, when the power supply device is of the non-fast charging type, transmit an electromagnetic signal in a second wireless charging mode to charge the battery, wherein a charging speed of the wireless transmitter circuit charging the battery in the first wireless charging mode is greater than a charging speed of the wireless transmitter circuit charging the battery in the second wireless charging mode.

2. The wireless charging device of claim 1, wherein the communication control module is configured to:
    when the power supply device is in the sleep state, control an output current of the power supply device to be greater than or equal to a preset value, to enable the power supply device to enter the wakeup state.

3. The wireless charging device of claim 2, wherein the wireless charging device further comprises a load circuit, and
    the communication control module is configured to:
        when the power supply device is in the sleep state, control the output current of the power supply device to be greater than or equal to the preset value by switching on the load circuit.

4. The wireless charging device of claim 1, wherein communication between the communication control module and the power supply device is bidirectional communication.

5. The wireless charging device of claim 1, wherein the power supply device is coupled with the wireless charging device via a charging interface.

6. The wireless charging device of claim 5, wherein the charging interface is a USB interface, and the communication control module communicates with the power supply device based on data wires of the USB interface.

7. The wireless charging device of claim 1, wherein the wireless charging device further comprises a wireless transmitter circuit and a voltage conversion circuit,
    the voltage conversion circuit is configured to:
        when the power supply device is of the non-fast charging type, perform boost process on an output voltage of the wireless transmitter circuit, to enable the wireless transmitter circuit to transmit an electromagnetic signal in a first wireless charging mode to charge a battery of a device to be charged; or
        when the power supply device is of the fast charging type, perform step-down process on an output voltage of the wireless transmitter circuit, to enable the wireless transmitter circuit to transmit an electromagnetic signal in a second wireless charging mode to charge the battery,
    wherein a charging speed of the wireless transmitter circuit charging the battery in the first wireless charging mode is greater than a charging speed of the wireless transmitter circuit charging the battery in the second wireless charging mode.

8. The wireless charging device of claim 7, wherein the first wireless charging mode is a wireless charging mode in which an output power of the wireless transmitter circuit is variable, and the second wireless charging mode is a wireless charging mode in which the output power of the wireless transmitter circuit is fixed.

9. The wireless charging device of claim 7, wherein in the first wireless charging mode, the communication control module is configured to:
    perform wireless communication with the device to be charged to determine at least one of a charging voltage or a charging current presently required by the battery; and
    adjust a transmitting power of the wireless transmitter circuit, such that the power of the electromagnetic signal transmitted by the wireless transmitter circuit matches at least one of the charging voltage or the charging current presently required by the battery.

10. The wireless charging device of claim 1, wherein the power supply device is integrated in the wireless charging device.

11. A wireless charging method, comprising:
    when a power supply device is in a sleep state, a wireless charging device controlling the power supply device to enter a wakeup state; and
    the wireless charging device communicating with the power supply device in the wakeup state, to determine a type of the power supply device, wherein the type of the power supply device comprises a fast charging type and a non-fast charging type, a maximum output power of the power supply device of the fast charging type is greater than or equal to a preset value, and a maximum output power of the power supply device of the non-fast charging type is less than the preset value, wherein when the power supply device is of the fast charging type, the wireless charging device charges a battery of a device to be charged in a first wireless charging mode, wherein when the power supply device is of the non-fast charging type, the wireless charging device charges the battery of the device to be charged in a second wireless charging mode, and wherein a charging speed of the wireless charging device charging the battery in the first wireless charging mode is greater than a charging speed of the wireless charging device charging the battery in the second wireless charging mode.

12. The wireless charging method of claim 11, wherein, when the power supply device is in the sleep state, the wireless charging device controlling the power supply device to enter the wakeup state, comprises:

when the power supply device is in the sleep state, the wireless charging device controlling an output current of the power supply device to be greater than or equal to a preset value, to enable the power supply device to enter the wakeup state.

13. The wireless charging method of claim 12, wherein when the power supply device is in the sleep state, the wireless charging device controlling the output current of the power supply device to be greater than or equal to the preset value, comprises:

when the power supply device is in the sleep state, the wireless charging device controlling the output current of the power supply device to be greater than or equal to the preset value by switching on a load circuit.

14. The wireless charging method of claim 11, wherein communication between the wireless charging device and the power supply device is bidirectional communication.

15. The wireless charging method of claim 11, further comprising:

when the power supply device is of the non-fast charging type, performing boost process on an output voltage of the wireless charging device, to enable the wireless charging device to transmit an electromagnetic signal in a first wireless charging mode to charge a battery of a device to be charged; or when the power supply device is of the fast charging type, perform step-down process on an output voltage of the wireless charging device, to enable the wireless charging device to transmit an electromagnetic signal in a second wireless charging mode to charge the battery, wherein a charging speed of the wireless charging device charging the battery in the first wireless charging mode is greater than a charging speed of the wireless charging device charging the battery in the second wireless charging mode.

16. The wireless charging method of claim 11, wherein the first wireless charging mode is a wireless charging mode in which an output power of a wireless transmitter circuit of the wireless charging device is variable, and the second wireless charging mode is a wireless charging mode in which the output power of the wireless transmitter circuit of the wireless charging device is fixed.

17. The wireless charging method of claim 11, wherein in the first wireless charging mode, a power of the electromagnetic signal transmitted by the wireless charging device matches at least one of a charging voltage or a charging current present required by the battery.

18. The wireless charging method of claim 11, wherein the wireless charging device charging the battery of the device to be charged in the first wireless charging mode comprises:

the wireless charging device performing wireless communication with the device to be charged to determine at least one of a charging voltage or a charging current presently required by the battery; and the wireless charging device adjusting a transmitting power, such that a power of the electromagnetic signal transmitted by the wireless charging device matches the at least one of the charging voltage or the charging current presently required by the battery.

* * * * *